United States Patent

Uchida et al.

[11] Patent Number: 5,943,543
[45] Date of Patent: Aug. 24, 1999

[54] HEAT TRANSMITTING MEMBER AND METHOD OF MANUFACTURING THE SAME

[75] Inventors: Tatsuya Uchida; Hatsue Hiratsuka, both of Shimodate; Yasuo Kamigata; Takeshi Yoshida, both of Tsukuba; Hidefumi Tsuboi, Utsunomiya, all of Japan

[73] Assignee: Hitachi Chemical Company, Ltd., Tokyo, Japan

[21] Appl. No.: 08/669,520

[22] PCT Filed: Dec. 27, 1994

[86] PCT No.: PCT/JP94/02249

§ 371 Date: Jun. 26, 1996

§ 102(e) Date: Jun. 26, 1996

[87] PCT Pub. No.: WO95/18350

PCT Pub. Date: Jul. 6, 1995

[30] Foreign Application Priority Data

Dec. 27, 1993 [JP] Japan ................................. 5-333202
Nov. 16, 1994 [JP] Japan ................................. 6-281839

[51] Int. Cl.$^6$ .................................................. B22F 3/10
[52] U.S. Cl. ................................. 419/2; 419/9; 419/37; 419/57; 264/497
[58] Field of Search ........................ 419/2, 9, 37, 57; 264/497

[56] References Cited

U.S. PATENT DOCUMENTS

| 3,078,552 | 2/1963 | Grandey et al. ........................ 29/182 |
| 4,101,691 | 7/1978 | Borchert . | |
| 4,136,428 | 1/1979 | Godsey et al. ......................... 29/157 |
| 4,285,385 | 8/1981 | Hayashi et al. . | |
| 4,680,161 | 7/1987 | Muto ........................................ 419/3 |
| 4,885,129 | 12/1989 | Leonard et al. ........................ 419/2 |
| 5,564,064 | 10/1996 | Martin ..................................... 419/5 |
| 5,590,383 | 12/1996 | Sekhar et al. .......................... 419/2 |
| 5,640,669 | 6/1997 | Harada et al. ........................ 428/552 |

FOREIGN PATENT DOCUMENTS

| 2372514 | 6/1978 | France . |
| 1533013 | 12/1969 | Germany . |
| 3021384 | 12/1981 | Germany . |
| A-51-18357 | 2/1976 | Japan . |
| A-51-24557 | 2/1976 | Japan . |
| A-51-93463 | 8/1976 | Japan . |
| A-53-33905 | 3/1978 | Japan . |
| A-4110597 | 4/1992 | Japan . |
| A-4371800 | 12/1992 | Japan . |
| AN-94-80 829 | 2/1992 | Russian Federation . |

Primary Examiner—Daniel J. Jenkins
Attorney, Agent, or Firm—Pennie & Edmonds LLP

[57] ABSTRACT

This invention provides a heat transmitting pipe and a heat transmitting plate which are capable of greatly improving the heat transfer efficiency of a conventional finned heating pipe and a convention heating plate. Copper oxide powder is deposited in a vapor phase onto a cellular synthetic resin coated with an adhesive beforehand. Thereafter, a copper plate with the same metal powder deposited thereon is placed on one surface of the metal powder-bearing cellular synthetic resin and is brought into lightly pressed contact with the surface by a roll press or the like, to thereby form a laminated article. Subsequently, the cellular synthetic resin is burnt off in a combustion furnace, to thereby produce a cellular metal material of the copper oxide on the copper plate. Further, the cellular metal material is reduced and sintered in a reducing atmosphere such as that of a hydrogen reduction furnace, to thereby produce a cellular copper material which is provided with the copper plate on one surface thereof. The cellular copper material can be directly used as a material for working a heat transmitting plate in a heat exchanger.

9 Claims, 7 Drawing Sheets

HEAT TRANSMITTING MEMBER AND METHOD OF MANUFACTURING THE SAME

FIELD OF THE INVENTION

The present invention relates to heat transmitting members, such as a heat transmitting pipe and a heat transmitting plate for heat exchange, which are employed in various industrial fields. It also relates to methods of manufacturing the heat transmitting members.

DESCRIPTION OF RELATED ART

Heretofore, heat transmitting pipes and heat transmitting plates made of metals such as copper and aluminum exhibitive of high thermal conductivities have generally been used for exchanging heat, e. g., between liquids, between a liquid and a gas, and between gases. It is admitted, however, that the capacity of heat to be exchanged is determined depending upon a temperature difference, heat transmission characteristics, a heat transmission area, etc. which are involved between the respective thermal media. Accordingly, especially in a case where a heat exchanger needs to be reduced in size, the mere use of the material exhibitive of the high thermal conductivity is unsatisfactory. Therefore, the heat transmission area has been enlarged by providing fins on or slots in the surface of the heat transmitting pipe or plate. Further, the heat transmission characteristics have been enhanced by contriving a fin construction so as to generate a turbulent flow in the thermal media. Besides, in the official gazettes of Japanese Patent No. 1435526 and Japanese Patent Application Laid-open (KOKAI) No. 110597/1992, there have been proposed techniques in which a porous material or foamed material of copper or copper alloy is fixed, whereby both the enlargement of the heat transmission area and the enhancement of the heat transmission characteristics are attained to reduce the size of the heat exchanger.

The proposed techniques, however, have been disadvantageous as stated below. In fixing the porous or foamed material of copper or copper alloy, the technique of Japanese Patent No. 1435526 adopts for the binding and close adhesion of this material with the body of the heat transmitting member, a method wherein molten metal is poured into a mold having the shape of the foamed material and is solidified, followed by the dissolution of the foamed material-shaped mold. On the other hand, the technique of Japanese Patent Application Laid-open No. 110597/1992 requires a further expedient such as pressed contact, brazing or plating at the final step of the fixing in order to rigidly join the porous material with the body of the heat transmitting member. The prior-art techniques accordingly have the problems that the cost of equipment and the cost of manufacture rise unreasonably compared with the attained effects of enlarging the heat transmission area and enhancing the heat transmission characteristics, and that the process of manufacture becomes complicated. Another problem is that, in the manufacture of the heat transmitting pipe, the porous or foamed material cannot be fixed simultaneously inside and outside the body of the pipe.

DISCLOSURE OF THE INVENTION

The present invention is intended to solve the problems as stated above. It has for its object to provide a heat transmitting member in which the body thereof such as a metal plate or metal pipe of high thermal conduction is overlaid with a porous metal material having a large surface area and a high percentage of voids per unit volume, and a continuous and complete method of manufacturing the heat transmitting member.

According to the present invention, a heat transmitting pipe and a heat transmitting plate in which a porous metal material of three-dimensional reticulate structure is unitarily fixed on, at least one of the surfaces of a metal pipe and a metal plate, respectively, can be obtained by utilizing the property that powder of copper oxide, or mixed powder which consists of the copper oxide powder and powder of other metal such as nickel, aluminum, chromium, palladium or silver, is sintered as a metal material by heating, and the property that the metal material can be made unitary with the metal pipe or plate when the heating is carried out on this metal pipe or plate.

FIGS. 1 thru 3 are flowcharts each showing an embodiment of a method of manufacture according to the present invention. Now, the embodiments will be described in conjunction with these figures.

Referring to FIG. 1, powder of copper oxide, or mixed metal powder which consists of the copper oxide powder and powder of any other suitable metal, is deposited in a vapor phase onto a cellular synthetic resin which is coated with adhesives (including pressure sensitive adhesives) beforehand. Thereafter, a copper plate/copper plates on which the same metal powder is deposited is/are placed on either/both of the surfaces of the cellular synthetic resin with the metal powder deposited thereon, and it/they is/are brought into lightly pressed contact with the resin by a roll press or the like, to thereby form a laminated article. On this occasion, as the quantities of deposition of the metal powder on the cellular synthetic resin and the copper plate are larger, securer sintering-binding can be finally achieved between the metal plate and a cellular metal material, and the rugged parts of the surface of the metal plate can be more increased to enhance the heat transmission characteristics of a heat transmitting member and enlarge the heat transmission area thereof. Subsequently, the cellular synthetic resin in the laminated article is burnt off in a combustion furnace. Thus, a porous metal material whose skeleton is made of the copper oxide or a metal alloy containing the copper oxide is produced on the copper plate. Further, the porous metal material is reduced and sintered in a reducing atmosphere such as exists in a hydrogen reduction furnace. Then, a porous material of copper or copper alloy provided with the copper plate or copper plates on one surface or both the surfaces thereof is manufactured. Here, the porous copper material or copper alloy material can be directly employed as a material for working the heat transmitting plate of a heat exchanger. Meanwhile, in a case where the heat transmitting member is a heat transmitting pipe, the porous copper material or copper alloy material is further processed by an expedient as stated below. At the stage at which the cellular copper material or copper alloy material is formed by the reduction and sintering, the initial volume shrinks. In other words, a marginal edge on which the cellular copper material or copper alloy material is not fixed appears at the whole perimeter of the copper plate. The expedient utilizes this property. More specifically, the copper plate bearing the reduced and sintered material is bent inwards or outwards by a roll or the like so as to be worked into a copper pipe. Thereafter, the end parts of the copper pipe in an identical direction are welded by, for example, brazing or fusion welding. Then, the heat transmitting pipe, which bears the cellular metal material inside or outside, can be manufactured.

As shown in FIG. 2, a heat transmitting pipe which bears a cellular metal material outside is continuously and completely manufactured in such a way that a cellular synthetic resin, on which metal powder is deposited as stated before, is wound round a copper pipe outside which the same metal powder is deposited, so as to be in pressed contact with the copper pipe, and that the cellular synthetic resin and the metal powder are subjected to a combustion step and a reduction and sintering step likewise to the foregoing.

On the other hand, a heat transmitting pipe which bears a porous metal material inside can be similarly manufactured continuously and completely as shown in FIG. 3. A cellular synthetic resin on which metal powder is deposited is shaped into a cylinder, and the cylinder is inserted into a copper pipe inside which the same metal powder is deposited, so as to be in fit engagement with the copper pipe. Thereafter, the cellular synthetic resin and the metal powder are subjected to a combustion step and a reduction and sintering step likewise to the foregoing. By the way, a heat transmitting pipe which bears porous metal material layers on both the inner and outer surfaces of a copper pipe can be similarly manufactured continuously and completely by winding the cellular synthetic resin round the copper pipe so as to be in pressed contact, as shown in FIG. 2, and inserting the cellular synthetic resin into the same copper pipe so as to be in fit engagement, as shown in FIG. 3.

FIG. 5 is a perspective view showing the heat transmitting pipe which bears the porous metal material layers on both the inner and outer surfaces of the copper pipe. In the figure, numerals 1 and 2 designate the porous metal materials, and numeral 3 designates the copper pipe.

Incidentally, a heat transmitting pipe or a heat transmitting plate which bears a plurality of layers of porous metal materials having unequal void diameters can be manufactured as stated below. Metal powder is deposited onto each of at least two sorts of cellular synthetic resins having the unequal void diameters. Thereafter, the cellular synthetic resins are formed into a laminated article in lightly pressed contact by a roll press or the like. Subsequently, the laminated article is submitted to any of the foregoing processes in conformity with the desired product.

The metal powder to be employed in the present invention is not restricted to the copper oxide powder, or the mixed metal powder which consists of the copper oxide powder and the other metal powder. The metal/metals of the metal powder is/are selected from among, for example, nickel, aluminum, chromium, palladium and silver, appropriately in accordance with an intended use. The diameter of the metal powder should preferably lie within a range of 0.1 to 50 ($\mu$m).

FIG. 4 is a flowchart showing other embodiments of the method of manufacture according to the present invention. Now, the embodiments will be described in conjunction with this figure.

A raw material for producing a porous metal material which has a large surface area and a high percentage of voids per unit volume, is obtained by any of the following methods:

(1) A method using a three-dimensional reticulate structure with the metal powder deposited thereon: for example, a material having a three-dimensional reticulate structure, which is adapted to be burnt off by heating, for example, a cloth of natural fiber, a cloth of artificial fiber, or a cellular synthetic resin such as urethane foam or polyethylene foam having open cells, is employed as the basic material of the raw material. The skeleton of the three-dimensional reticulate structure is coated with a pressure sensitive adhesive. Metal powder such as powder of single metal, mixed powder of plurality of metals, or fine pieces of metal fiber, is deposited onto the three-dimensional reticulate structure in a vapor phase.

(2) A method using a material which is adapted to be burnt off by heating and which can form a three-dimensional reticulate structure, for example, a sheetlike molded article obtained in the same way as making paper with a fiber such as pulp or wool fiber and metal powder.

(3) A method using a resinous slurry which is a synthetic resin before blowing into cellular material, for example, cellular urethane or cellular polyethylene, previously kneaded with a powdery metal material, such as metal powder or fine pieces of metal fiber.

Next, the raw material of the porous metal material may be laminated or joined with a metal member by methods as stated below. With the method (3) described above, the desired part of the metal member is coated with the resinous slurry beforehand. In a case where the metal member is a metal pipe, the resinous slurry is packed into the metal pipe beforehand. Thereafter, the resinous slurry is blown and sintered.

With the method (1) or (2), in a case where the metal member is a metal plate, the three-dimensional reticulate structure with the metal powder deposited thereon or the like is brought into pressed contact with one surface or both the surfaces of the metal plate. In another aspect of performance, the three-dimensional reticulate structure with the metal powder deposited thereon or the like is sandwiched in between two metal plates and is brought into pressed contact therewith. On this occasion, in order to realize more secure joining between the three-dimensional reticulate structure with the metal powder deposited thereon or the like and the body of the heat transmitting member, the metal powder of the same material as the above-mentioned metal powder should desirably be deposited on the surface of the metal plate in a previous step such as coating this surface with a pressure sensitive adhesive and then covering it with the same metal powder, or coating this surface with a pressure sensitive adhesive in which the same metal powder is kneaded. Here, enhancement in the strength of the sintering between the member body and the porous metal material is intended as a result of the increased contact between the particles of the metal powder. As a result, the mutual anchor effect between the member body and the porous metal material is hightened. The process also contributes to further enlarging the heat transmitting surface area therebetween.

In the case of a metal pipe, similarly, it is preferable that the same metal powder is deposited onto the surface of the metal pipe beforehand, whereupon the three-dimensional reticulate structure with the metal powder deposited thereon, or the like, is brought into pressed contact with the surface of the metal pipe. On this occasion, the outer surface of the metal pipe can be easily covered with the raw material by helically winding the raw material round the metal pipe. On the other hand, the inner surface of the metal pipe can be covered with the raw material in such a way that the three-dimensional reticulate structure with the metal powder deposited thereon or the like is previously shaped into a cylindrical article whose outside diameter is somewhat larger than the inside diameter of the metal pipe, and that the cylindrical article is inserted into the metal pipe so as to be in fit engagement therewith. It is also possible that the three-dimensional reticulate structures with the metal powder deposited thereon, or the like, that have unequal reticular-mesh sizes or pore sizes, are stacked into a multiple layer beforehand, and that the multiple layer is brought into pressed contact with the metal pipe. Moreover, it is possible to stack the above raw materials onto the metal pipe several times. Further, the three-dimensional reticulate structure with the metal powder deposited thereon, or the like, can be stacked in pressed contact onto the body of the heat transmitting member coated with the resinous slurry. In another aspect of performance of the present invention, a heat transmitting member as an assembly can be manufactured in such a way that the three-dimensional reticulate structure with the metal powder deposited thereon is arranged surrounding a plurality of metal pipes at once, or that the three-dimensional reticulate structure with the metal powder deposited thereon is divided into the shape of blocks, through which a plurality of metal pipes are passed so as to be unitary therewith.

Incidentally, the particles of the metal powder can be closely deposited onto the skeleton of the basic material in such a way that the basic material after the deposition of the metal powder and before heat treatment is wetted with a liquid, followed by drying. Consequently, the porous metal material after the heat treatment becomes higher in strength. More specifically, the metal powder deposited on the surface of the basic material is wetted with the liquid, and it is flocculated by the surface tension of the liquid at the drying step. An expedient for wetting the metal powder is, for example, immersing the basic material in the liquid or spraying the liquid onto the basic material. Although the liquid may be any one which does not degrade the adhesion between the basic material and the metal powder, water is the most practicable. Besides, the strength of the porous metal material after the baking can be further enhanced by doping the liquid with a binding agent, for example, an adhession-increasing high polymer such as methylcellulose or polyvinyl alcohol. Further, the liquid may well contain metallic ions. By way of example, when an aqueous solution containing cuprous ions is employed, a cuprous reticulate structure exhibits a heightened strength, and when a solution containing cobalt ions or chromium ions is employed, the electrical conductivity or the thermal expansion coefficient of the raw material can be controlled.

Next, the heating step of the manufacturing method will be explained.

As stated before, the three-dimensional reticulate structure with the metal powder deposited thereon is placed on the surface of the body of the heat transmitting member, the molded sheet containing the metal powder is placed on the surface of the member body, or the surface of the member body is coated with the metal powder-containing resinous slurry, the synthetic resin of which is subsequently foamed into the three-dimensional reticulate structure. Thereafter, the resulting member body is heated to burn off the basic material such as the three-dimensional reticulate structure or the fiber and to sinter the metal powder. Thus, the porous metal material is produced, while at the same time, it is made unitary with the surface of the member body by fusion welding. In this manner, it is required at the heating step to remove the basic material such as the three-dimensional reticulate structure, to mutually sinter the metal powder and the member body, and to sinter the metal powder unitarily with the member body. It is more preferable that temperatures for the heating steps are not high.

Regarding the removal of the basic material and the adhering material, any of the animal and vegetable fibers and the synthetic resins can be burnt off by heating and roasting in an inert or reducing atmosphere or by heating and combustion in an oxidizing atmosphere. Herein, when the metal powder is of metal oxide, oxygen contained in the metal oxide is consumed by the heating and roasting of a hydrogen source or carbon contained in the basic material, under the condition of the inert or reducing atmosphere, and simultaneously, the metal powder is sintered as a pure metal. The inert atmosphere is a gaseous one of nitrogen, argon, helium or the like, while the reducing atmosphere is a gaseous one of hydrogen gas, hydrocarbon gas, water gas, ammonia gas or the like. Further, a hydrocarbon compound, a sulphur compound, a phosphor compound or a hydrogenated substance can be preliminarily mixed or kneaded into the basic material. However, in a case where the basic material employed, such as the three-dimensional reticulate structure, is difficult to gasify and easy to carbonize in the inert or reducing atmosphere, it is burnt off in the oxidizing atmosphere by introducing air. In the case where the basic material can be burnt off by the heating and roasting in the inert or reducing atmosphere, the metal powder can be directly sintered into the porous metal material. In the case where the basic material is burnt off in the oxidizing atmosphere by introducing the air, the sintering of the metal powder into the porous metal material is carried out in the reducing atmosphere of the hydrogen gas, the hydrocarbon gas, the water gas, the ammonia gas or the like. Besides, in the case of using the oxide for the metal powder, the sintering into the porous metal material is carried out in a reducing atmosphere. On this occasion, the reducing atmosphere is not restricted to the gaseous phase, but it may well be a liquid phase. More specifically, the reducing atmosphere in the liquid phase can be prepared in such a way that the conditions of reduction, such as the temperature and pH-value of an aqueous solution are adjusted in the aqueous solution of any of alcohols, aldehydes, saccharoids, hydrogenated substances, etc.

In this manner, the sintering (heating) step is effected by the method which employs the inert gas as the gaseous inert atmosphere, the method which employs the reducing gas as the gaseous reducing atmosphere, the method in which the reducing substance is preliminarily mixed into the basic material, or the method in which the reducing substance is preliminarily mixed into the molded article. It is also possible to first use the oxidizing atmosphere (air) and subsequently use the reducing atmosphere (e. g., the reducing gas in the gaseous atmosphere, or the reducing solution in the atmosphere liquid).

The heat transmitting member in which the porous metal material is sintered on the surface of the member body such as the metal plate or metal pipe, can be manufactured by the method described above. Further, in order to finally enlarge the specific surface area of the heat transmitting member, minutely rugged surface can be formed on the skeleton of the porous metal material by electroplating or electroless plating. In the electroplating, the heat transmitting member is set as a cathode, and the same metal material as the porous metal material or a precipitable metal material different therefrom is galvanized at a comparatively high current density in an electroplating bath so as to precipitate dendritic metal. On the other hand, in the electroless plating, metal precipitation similar to that of the electroplating is attained by setting the loading factor of the plating (an area to be plated/the volume of a plating bath) to be comparatively high.

Besides, in consideration of the actual application of the heat transmitting member, it is preferable to preliminarily oxidize a heat transmitting face (the surface of the porous metal material, etc.) for the purposes of passivation and corrosion protection, or to bestow a property such as wettability or water repellance on the transmitting face. This treatment is also effective to enhance the performance and characteristics of the heat transmitting member.

The preliminary oxidation can be done by gaseous-phase oxidation based on heating or oxidation with ozone, or by liquid-phase oxidation with, e. g., an aqueous solution of peroxide (such as peroxyammonium, potassium permanganate or sodium perchlorate) or an alkaline aqueous solution.

The wettability or the water repellance can be bestowed by, for example, coating the heat transmitting face with a silicate type hydrophilic coating material or a teflon type coating material. When a hydrophilic coating material containing silicon dioxide is applied on the heat transmitting face in order to cope with corrosion, the heat transmitting performance can be improved or maintained on the basis of an enhanced wettability.

A supplementary explanation will be given on the method (2) shown in FIG. 4. The animal or vegetable fiber, carbon fiber, or granular active carbon is kneaded or added to the metal powder consisting of or constituted by the copper powder or the copper oxide powder, to thereby obtain the sheetlike molded article in a similar way as making paper. The molded sheet is placed on the metal copper plate on which the metal powder consisting of or constituted by the copper powder or the copper oxide powder is deposited. Alternatively, the molded sheet is inserted into the metal copper pipe in fit engagement with the inner surface thereof, or/and it is wound round the metal copper pipe in pressed contact with the outer surface thereof. Subsequently, the metal powder of the molded sheet and that of the metal copper plate or pipe are sintered. Then, the heat transmitting member bearing the porous metal material can be manufactured.

Reference will now be made to FIG. 6. The metal powder consisting of or constituted by the copper powder or the copper oxide powder, or a metallic short fiber being very fine, is previously mixed into the synthetic resin which can form the three-dimensional reticulate structure. Thereafter, the resulting synthetic resin is poured into the void of a frame in which the plurality of metal copper pipes are arranged laterally and vertically at predetermined intervals. Thereafter, the poured synthetic resin is foamed to fill up the void with the cellular resin. Subsequently, the metal powder or the metallic short fiber is sintered. Then, the heat transmitting member assembly in which the porous metal material is fixed and packed outside the metal copper pipes can be manufactured. In FIG. 6, numeral 4 designates one of the copper pipes, numeral 5 the frame, and numeral 6 the porous metal material.

BEST MODE FOR CARRYING OUT THE INVENTION

Example 1

Figure 1:
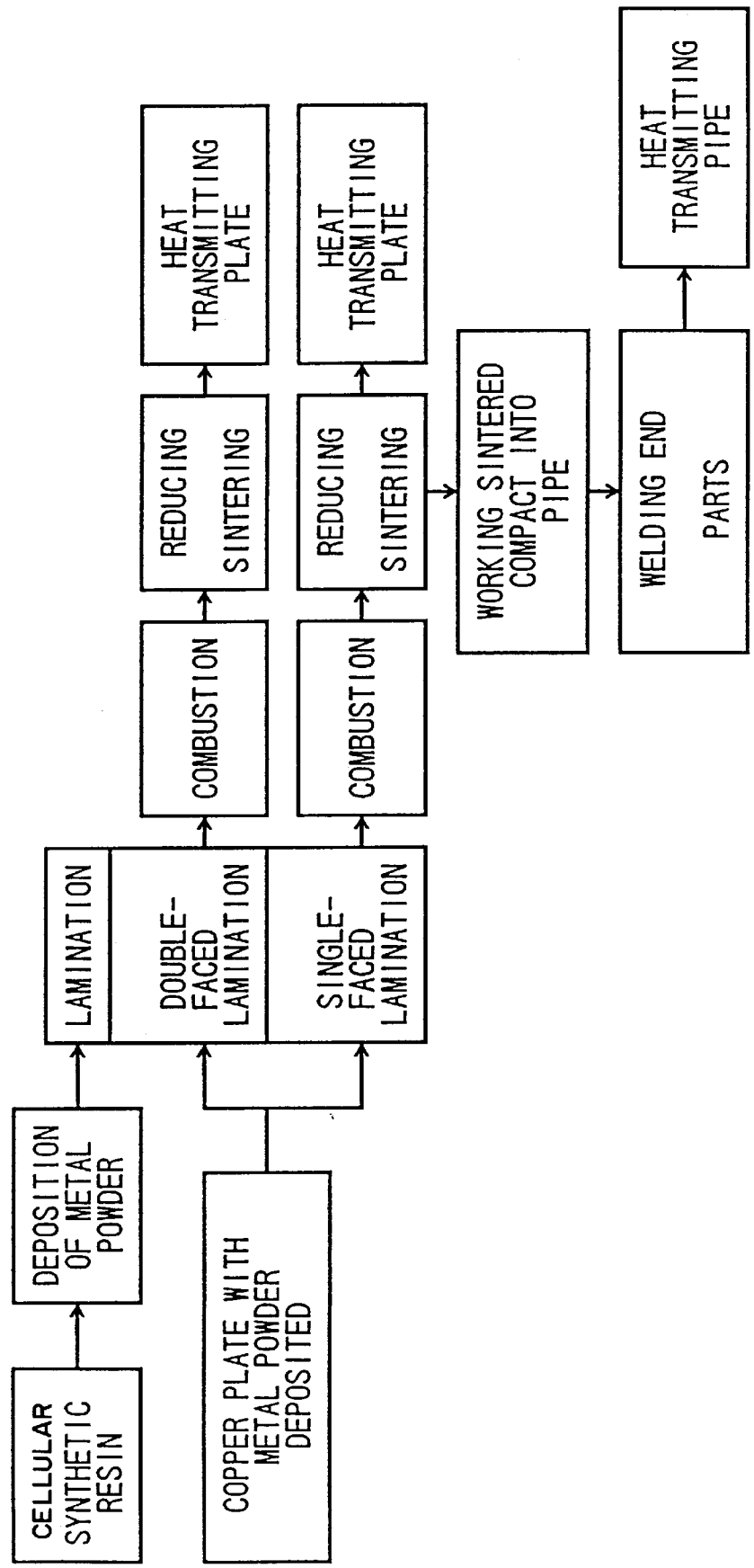
FIG. 1 is a flowchart showing an embodiment of a method of manufacture according to the present invention.
Figure 2:
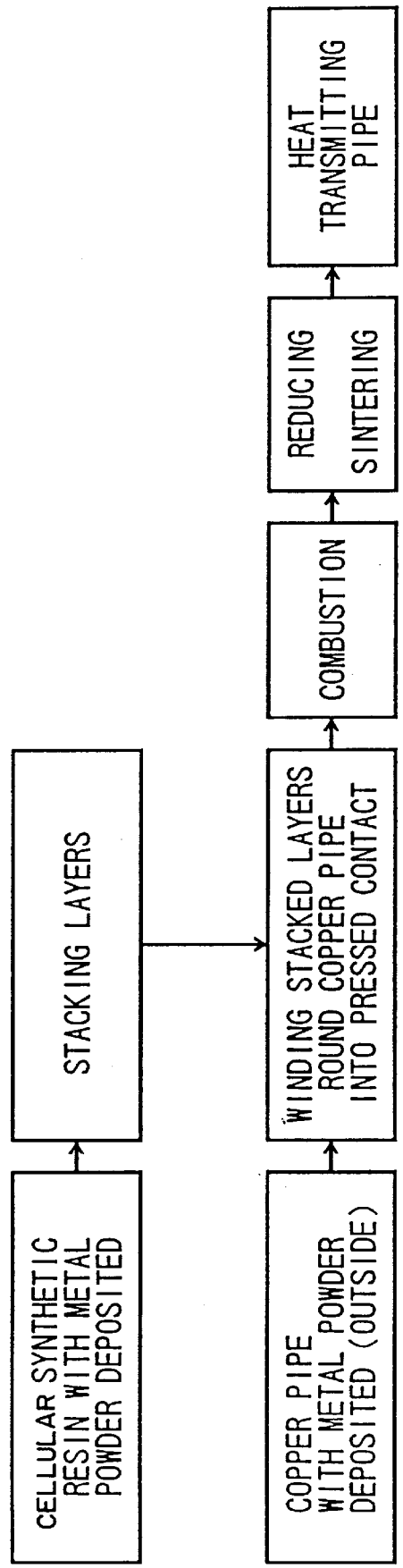
FIG. 2 is a flowchart showing an embodiment of a method of manufacture according to the present invention.
Figure 3:
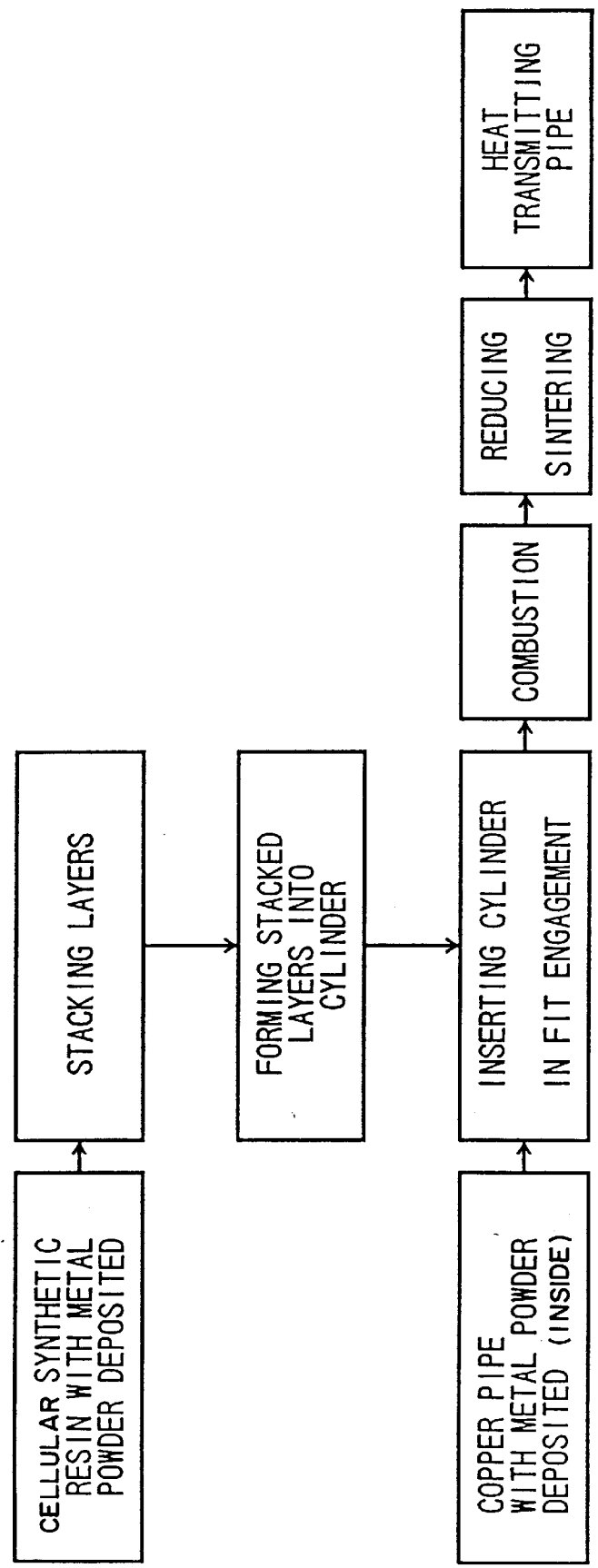
FIG. 3 is a flowchart showing an embodiment of a method of manufacture according to the present invention.
Figure 4:
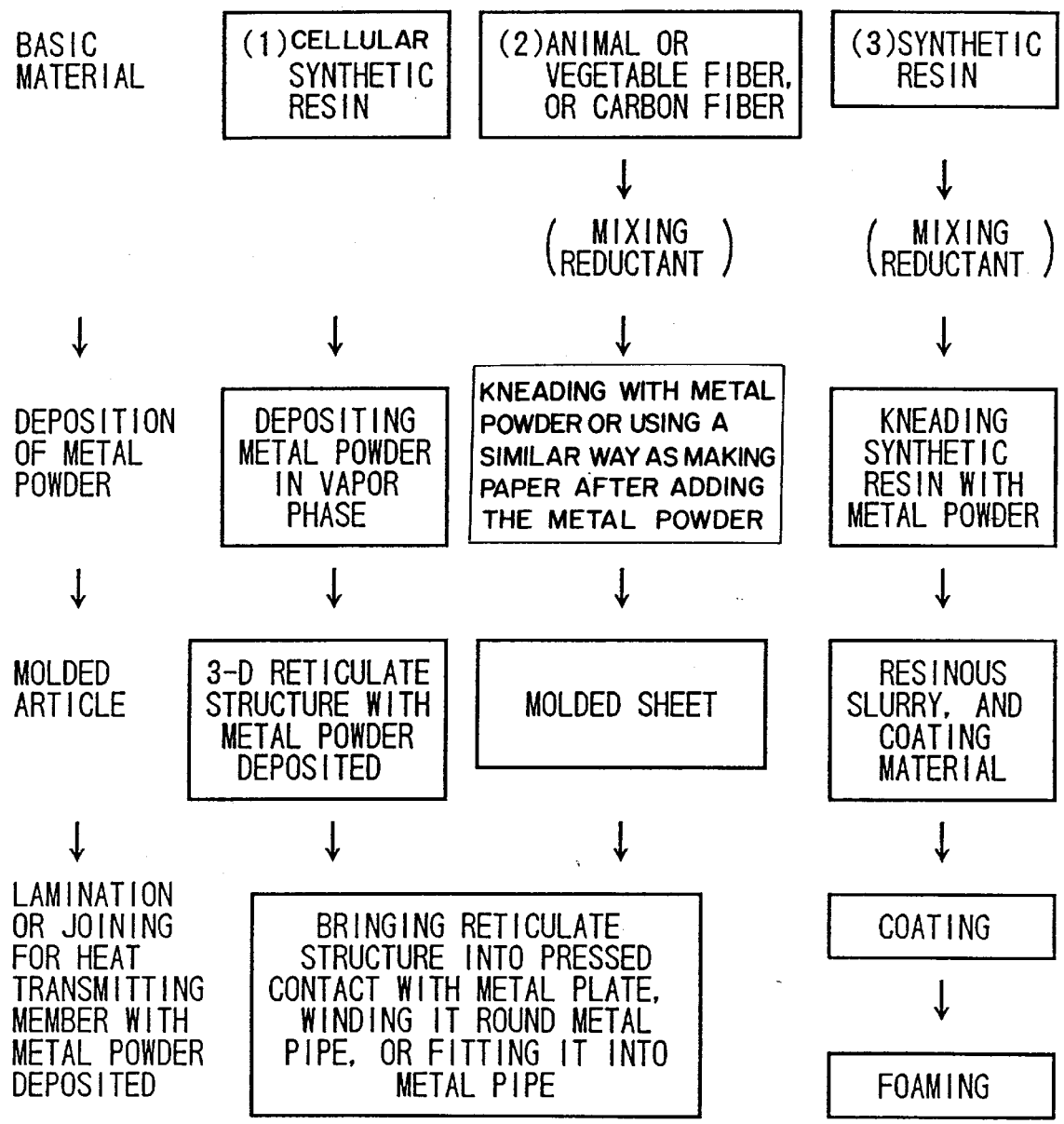
FIG. 4 is a flowchart showing an embodiment of a method of manufacture according to the present invention.
Figure 5:
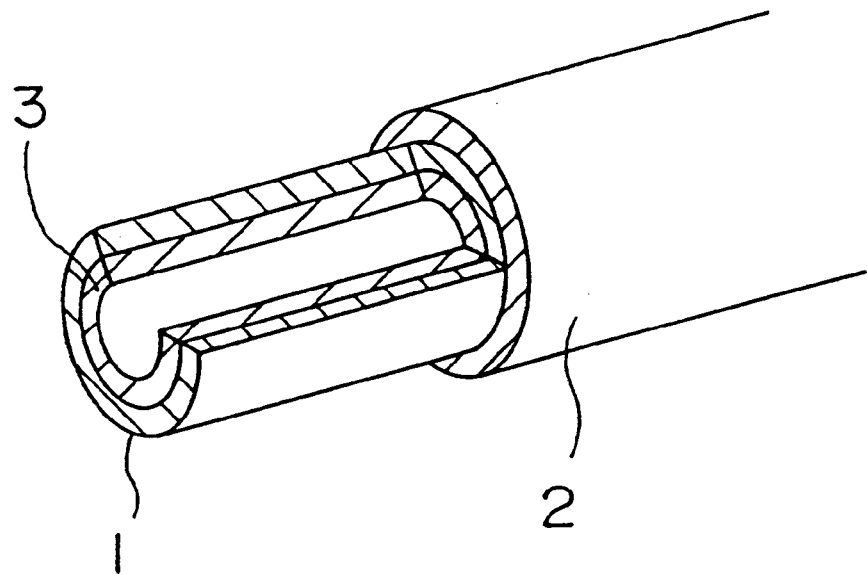
FIG. 5 is a perspective view showing an embodiment of a heat transmitting member according to the present invention.
Figure 6:
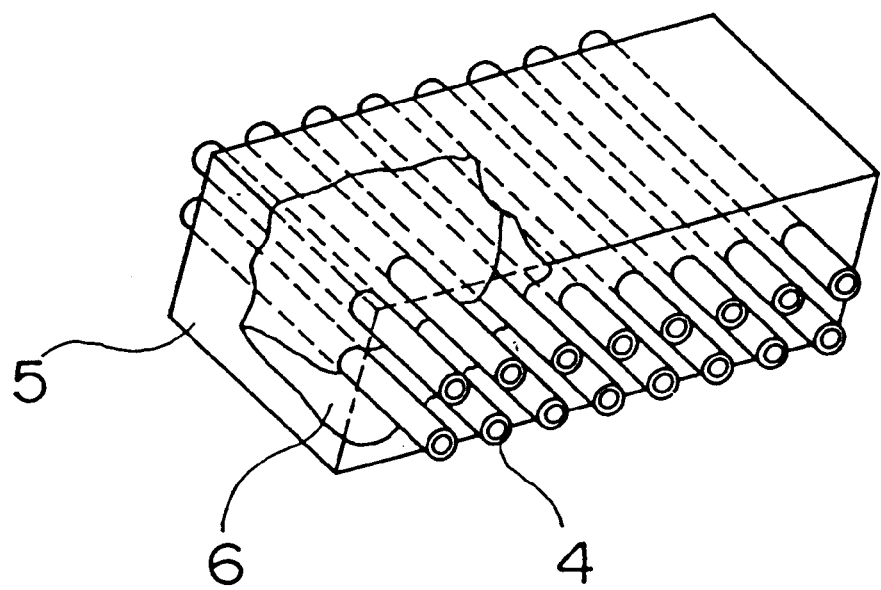
FIG. 6 is a perspective view, partly broken away, showing an embodiment of the heat transmitting member according to the present invention.
Figure 7:
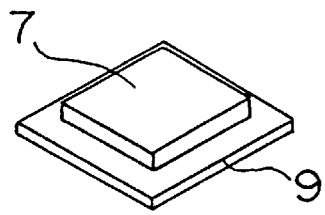
FIG. 7 is a perspective view showing an embodiment of the heat transmitting member according to the present invention.
Figure 8:
FIG. 8 is a sectional view showing an embodiment of the heat transmitting member according to the present invention.
Figure 9:
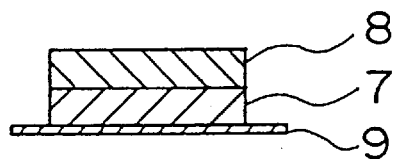
FIG. 9 is a sectional view showing an embodiment of the heat transmitting member according to the present invention.
Figure 10:
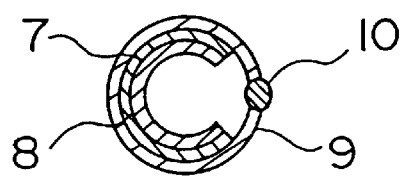
FIG. 10 is a sectional view showing an embodiment of the heat transmitting member according to the present invention.
Figure 11:
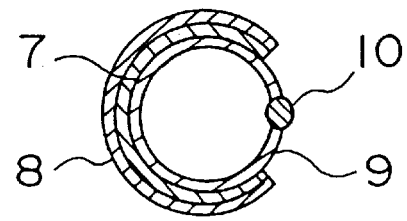
FIG. 11 is a sectional view showing an embodiment of the heat transmitting member according to the present invention.

Two sorts of specimens a and b were prepared from polyurethane foam (produced under the trade name of "EVER LIGHT SF" by Bridgestone Inc. in Japan) as a cellular synthetic resin. Each of the specimens a and b was 3 (mm) thick, 5 (cm) wide and 20 (cm) long. The specimen a had an average cell diameter of 0.6 (mm), while the specimen b had an average cell diameter of 0.8 (mm). The specimens of the polyurethane foam were endowed with adhesion by coating them with a pressure sensitive adhesive (an acrylic adhesive which contained a resin component of 5 (%) in ethyl methyl ketone used as a solvent). Further, the adhered specimens were dried. Subsequently, the specimens were thrust into copper oxide powder and were shaken therein so as to deposit the powder on these specimens in a gaseous phase. Thereafter, the resulting specimens were dipped into water and were shaken therein so as to uniformly deposit the copper oxide powder on the skeleton of the polyurethane foam. On the other hand, a copper plate used was 0.8 (mm) thick (the width and length thereof were equal to each other). Likewise to the polyurethane foam specimens, the specimens of the copper plate had their surfaces adhered by coating them with the adhesive, whereupon they had the copper oxide powder deposited uniformly onto their whole surfaces. Further, a copper pipe having and a thickness of 0.8 (mm) and an outside diameter of 10 (mm) was similarly treated. First, heat transmitting plates were manufactured as explained below. The copper plate specimens were respectively placed on one surface of the polyurethane foam-a specimen and on both the surfaces of the polyurethane foam-b specimen, and were respectively brought into lightly pressed contact with the polyurethane foam specimens. Thereafter, the polyurethane foam was burnt off by heating the polyurethane foam specimens and copper plate specimens held in pressed contact, at 500° C. in the atmospheric air for 10 minutes. Subsequently, the copper oxide powder was sintered by heating the resulting specimens at 900° C. in a reducing atmosphere of hydrogen gas for 20 minutes. Then, porous metal material was fixed on and made unitary with one or both surfaces of the copper plate having a porosity of 96% to obtain the heat transmitting plate shown in FIG. 7 or FIG. 8, respectively. In these figures, numeral 7 designates the porous metal material based on the polyurethane foam-a, numeral 8 the porous metal material based on the polyurethane foam-b, and numeral 9 the copper plate. Incidentally, at least two foam-a specimens or the foam-a and foam-b specimens were stacked, and the stacked layers were submitted to the same processing steps. Then, by way of illustration, the heat transmitting plate in which a multilayered foamed metal copper material was fixed unitarily with the metal plate could be obtained as depicted in FIG. 9. Next, heat transmitting pipes were manufactured as explained below. The foamed metal copper material produced on the copper plate in the case of FIG. 9 exhibited an areal shrinkage percentage of about 50 (%), and an edge on which the foamed metal copper material was not fixed appeared at the perimeter of the copper plate. Herein, in order to join the end parts of the heat transmitting member in the lengthwise direction thereof, the heat transmitting member was rolled widthwise into the copper pipe mentioned before, and the end parts were subsequently brazed to each other. Then, the heat transmitting pipes in which the foamed metal copper material was fixed inside and outside the copper pipe specimens were obtained as shown in FIG. 10 and FIG. 11, respectively. In these figures, numeral 10 indicates a brazing part.

Example 2

The polyurethane foam-a, polyurethane foam-b and copper pipe as specified in Example 1 were used to manufacture two kinds of heat transmitting pipes in each of which a foamed metal copper material was fixed outside the copper pipe. In one of the two kinds, the foam-b on which mixed powder consisting of copper oxide powder and fine nickel powder (at a weight ratio of 10 (%) with respect to the copper oxide powder) was deposited was placed on the copper pipe, while in the other, the foam-a and foam-b on which the mixed power was deposited were placed on the copper pipe. The specimen of the foam-b and the specimen of the foam-a and foam-b were helically wound round the copper pipe specimens in pressed contact therewith, respectively. Subsequently, the resulting copper pipe specimens were submitted to a combustion step and a reduction and sintering step which were similar to those of Example 1. Then, the desired heat transmitting pipes, in each of which the foamed metal copper material was fixed on the copper pipe, were obtained.

Example 3

The two polyurethane foam-a specimens and copper pipe as specified in Example 1 were used to manufacture a heat transmitting pipe in which a foamed metal copper material was fixed inside and outside the copper pipe. Copper oxide powder was deposited onto the two foam-a specimens. One of the resulting specimens was worked into the shape of a cylinder, the outside diameter of which was somewhat larger than the inside diameter of the copper pipe, and the cylinder was inserted into the metal pipe in fit engagement with the inner peripheral surface thereof. The other specimen was helically wound round the copper pipe in pressed contact with the outer peripheral surface thereof. Subsequently, the resulting copper pipe was submitted to a combustion step and a reduction and sintering step which were similar to those of Example 1. Then, the desired heat transmitting pipe in which the foamed metal copper material was fixed inside and outside the copper pipe was obtained.

Example 4

Polyurethane foam (produced under the trade name of "EVER LIGHT SF" by Bridgestone Inc. in Japan) having an average cell diameter of 0.6 (mm) was used as a three-dimensional reticulate structure. Each of nine specimens prepared from the polyurethane foam had a thickness of 3 (mm), a width of 5 (mm) and a length of 20 (mm), while each of three specimens had the same thickness and width as mentioned above and a length of 60 (mm). The specimens of the polyurethane foam were endowed with adhesion by coating them with a pressure sensitive adhesive (an acrylic adhesive which contained a resin component of 5 (%) in ethyl methyl ketone used as a solvent). Further, the adhered specimens were dried. Subsequently, three kinds of metal power were prepared, namely, copper oxide powder, copper powder, and mixed powder consisting of copper powder and nickel powder. In a gaseous phase, each specimen was thrust into the corresponding mixed power. In a gaseous phase, all the specimens were shaken so as to sufficiently deposit the metal powder on these specimens, respectively. Thereafter, the resulting specimens were dipped into water and were shaken therein so as to remove off the metal powder deposited in excess and also to uniformly deposit the metal powder on the skeleton of the polyurethane foam. On the other hand, a copper plate was used as a metal member, and six specimens each having the same area as that of each of the nine polyurethane foam specimens and a thickness of 0.6 (mm) were prepared as copper plate specimens. Each type of metal powder was deposited onto the surfaces of the copper plate specimens satisfactorily uniformly with the adhesive, respectively. Besides, a copper pipe was used as a metal pipe, and three specimens each having a diameter of about 20 (mm) were prepared as copper pipe specimens. Likewise to the above, each type of metal powder was sufficiently deposited onto the outer surfaces of the copper pipe specimen with the adhesive, respectively. Subsequently, the three sorts of polyurethane foam specimens bearing the corresponding sorts of metal powder were respectively joined to the copper plate specimens and copper pipe specimens bearing the same sorts of metal powder, so as to form laminated articles. More specifically, as regards heat transmitting plates, each of the polyurethane foam specimens bearing the three sorts of metal powder was joined on one surface or both the surfaces of the corresponding copper plate specimen in lightly pressed contact by a roll press, to thereby prepare the laminated article. Likewise, as regards heat transmitting pipes, each of the three polyurethane foam specimens bearing the three sorts of metal powder was wound round the corresponding copper pipe specimen in pressed contact. At the next step, each of the nine kinds of the heat transmitting members was heated at about 500° C. in an electric furnace while the air was being supplied thereinto. Then, the adhesive and the polyurethane foam being a basic material were burnt off, but the metal powder remained as a sintered compact on the copper plate with the skeleton of the three-dimensional reticulate structure left behind. Subsequently, each of the resulting preforms was further heated at about 900° C. in the electric furnace while a mixed gas consisting of hydrogen and nitrogen was being supplied thereinto. Then, it was reduced and sintered.

Figure 12:
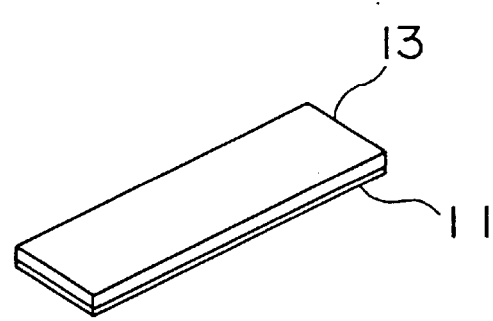
FIG. 12 is a perspective view showing an embodiment of the heat transmitting member according to the present invention.
Figure 13:
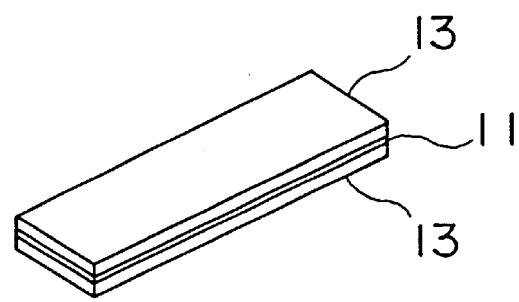
FIG. 13 is a perspective view showing an embodiment of the heat transmitting member according to the present invention.
Figure 14:
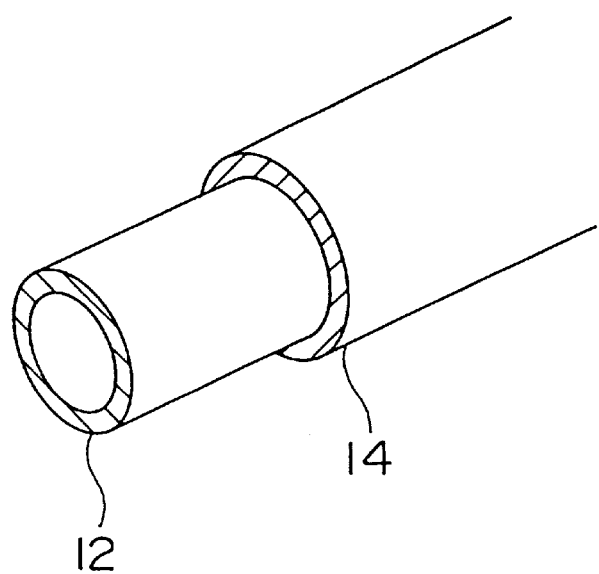
FIG. 14 is a perspective view showing an embodiment of the heat transmitting member according to the present invention.

As a result, the heat transmitting members which bore the three sorts of metal and which had three shapes could be obtained as illustrated in FIGS. 12, 13 and 14. In these figures, numeral 11 indicates the copper plate, numeral 12 indicates the copper pipe, and numerals 13 and 14 indicate the porous metal materials.

On this occasion, any of the porous metal copper materials on the members had a percentage of voids of 96 (%). In this regard, the three-dimensional reticulate structure of the metal copper material on the heat transmitting plate or heat transmitting pipe on which the copper oxide powder had been deposited as the metal powder beforehand, exhibited a voluminal shrinkage percentage of about 50 (%) at the reduction and sintering step. Accordingly, a part at which the metal copper material was not fixed appeared at the perimetric edge of the heat transmitting plate, and similar parts appeared at the end parts of the heat transmitting pipe. Therefore, the heat transmitting plate was rolled widthwise, and the mating ends of a copper pipe thus worked were brazed in the lengthwise direction thereof. Then, a heat transmitting pipe in which the porous metal copper material was fixed inside and outside the copper pipe was manufactured.

Example 5

Two sorts of specimens A and B (each being in the number of two) were prepared from polyurethane foam (produced under the trade name of "EVER LIGHT SF" by Bridgestone Inc. in Japan) as a three-dimensional reticulate structure. Each of the polyurethane foam specimens A and B was 3 (mm) thick, 5 (mm) wide and 60 (mm) long. The specimen A had an average cell diameter of 0.6 (mm), while the specimen B had an average cell diameter of 0.8 (mm). The polyurethane foam specimens were endowed with adhesion by coating them with an adhesive. Further, the adhered specimens were dried. Subsequently, the specimens were thrust into copper oxide powder flowing in the air, so as to deposit the powder thereon. Thereafter, the resulting specimens were dipped into water and were shaken therein so as to peel off the copper oxide powder deposited in excess and also to uniformly deposit the powder on the skeleton of the polyurethane foam. On the other hand, a copper pipe having an inside diameter of about 13 (mm) and an outside diameter of about 16 (mm) was used as a metal pipe, and two copper pipe specimens were prepared in the same manner as in Example 1. Regarding one of the copper pipe specimens, the polyurethane foam-B specimen was first wound helically round the outer surface of this copper pipe specimen, and the polyurethane foam-A specimen was further wound helically round the polyurethane foam-B specimen. Concurrently, regarding the other copper pipe specimen, the polyurethane foam-A and -B specimens placed on each other beforehand were inserted in fit engagement into this pipe specimen while being shaped into a cylinder with the foam-B specimen located on the pipe wall side of this pipe specimen. Next, the resulting earlier copper pipe specimen was directly submitted to a reduction and sintering step at 900° C. in an electric furnace while a mixed gas consisting of nitrogen gas and hydrogen gas was being introduced thereinto. The polyurethane foam gasified and volatilized away. The copper oxide powder was reduced into metal copper. That is, it turned into porous metal copper materials of two layers having unequal average cell diameters. The porous metal copper materials covered the whole outer surface of the earlier copper pipe specimen tightly owing to shrinkage. Thus, a heat transmitting pipe could be obtained. Incidentally, the reducing gas to be used herein is not restricted to the hydrogen gas, but it may well be any of hydrocarbon gas, hydrogen sulfide gas, ammonia gas, water gas, etc.

Meanwhile, the latter copper pipe specimen initially had the polyurethane foam burnt off in the electric furnace by introducing the air thereinto. Thereafter, the resulting latter copper pipe specimen was submitted to chemical reduction while being heated, by adding formaldehyde liquid exhibitive of a reducing action in an alkaline liquid. Thus, a heat transmitting pipe in which porous metal copper materials (A, B) of two layers having unequal average cell diameters covered the whole inner surface of the latter copper pipe specimen could be obtained similarly to the case of the earlier copper pipe specimen. Also usable as the reducing liquid is any of sodium hydrogen boride, sodium hydrogen carbonate, sodium sulfide, alcohol, etc. Herein, compared with the gaseous reduction method, the solution reduction method expends a longer time in reducing the entire skeleton of the three-dimensional reticulate structure and results in the coverage of lower strength. This solution reduction method, however, is applicable in the case of employing the finest possible metal powder and in some uses of heat transmitting pipes.

Example 6

Copper oxide powder of very small grains, pulp fiber, and an adhesive were dispersed in a solution. Thereafter, the same way as making paper was applied to the resulting dispersoid to prepare a dry sheet. On this occasion, the weight ratio of the copper oxide to the pulp should desirably be 30 (%) or more. The dry sheet was formed into a laminated article with a copper plate or a copper pipe in the same way as in Example 1. Further, the lamination was submitted, in an electric furnace to a combustion step using air (at 500° C.) and to a reduction and sintering step using hydrogen gas (at 900° C.). Then, a heat transmitting plate or a heat transmitting pipe could be manufactured. Herein, single-fiber wool, methyl cellulose, active carbon fiber, granular active carbon, etc. were concurrently used to prepare dry sheets. Even with these materials, porous metal materials could be similarly produced on heat transmitting members though they had unequal percentages of voids.

Example 7

An urethane coating material was prepared in such a way that copper oxide powder of very small grains was mixed into an urethane resin containing a foaming agent mixed therein beforehand, and that fluidity was afforded by a solvent. The urethane coating material was coated onto the surfaces of a copper plate. On the other hand, it was pressedly packed inside a copper pipe and was coated outside the copper pipe. Thereafter, the urethane coating material was foamed by heating. Each of the copper plate specimen and copper pipe specimen was submitted, in an electric furnace, to a combustion step using air (at 500° C.) and to a reduction and sintering step using hydrogen gas (at 900° C.) in the same way as in Example 4. Then, a heat transmitting plate, the front and rear surfaces of which were covered with a porous material of copper, could be manufactured. On the other hand, a heat transmitting pipe, the entire internal space of which was filled with a porous material of copper, and the outer surface of which was also covered with a porous copper material, could be manufactured. The percentage of voids of the porous copper material inside the pipe can be regulated by changing the foaming agent and foaming conditions such as the temperature of the foaming step. Herein, each of sulfur, phosphorus, sodium sulfide, sodium hydrogen carbonate, sodium hydrogen boride, etc. was further mixed into the coating material. Copper plate specimens and copper pipe specimens bearing such coating materials were merely heated under an oxygen-free condition, respectively. Even in this case, heat transmitting members similar to the above could be manufactured.

The heat transmitting member of the present invention can heighten a heat transmission efficiency sharply compared with the prior-art, heat transmitting pipe or plate furnished with fins.

In addition, according to the present invention, owing to the principle that the powder layers of the basic material and the member body are united with each other, in other words, that the porous metal material is securely sintered on the member body, the heat transmitting member has much better heat transmission characteristics compared in point of performance with the prior-art heat transmitting pipe or plate, in which a cellular material made of copper or a copper alloy is fixed. Moreover, when the multilayered or stacked-layer article of the basic material is employed, a turbulent flow in the heat transmission surface of the heat transmitting member is increased owing to the diffusion of the fluxes of the thermal media, so that the thermal conduction of the heat transmitting member is also increased.

Further, large numbers of steps and high accuracies of working are required in the prior-art methods of manufacture. In contrast, the heat transmitting plate or pipe in which the porous metal material is unitary with the plate or pipe body can be manufactured by the very simple steps in accordance with the present invention.

What is claimed is:

1. A method of manufacturing a heat transmitting member, comprising the steps of:

depositing metal powder onto a three-dimensional reticulate structure in a vapor phase;

placing the three-dimensional reticulate structure with said metal powder deposited thereon, on a surface of a body of said member; and heating the member body and the placed three-dimensional reticulate structure so as to burn off said three-dimensional reticulate structure and to sinter said metal powder, thereby producing a porous metal material and simultaneously making said porous metal material unitary with said member body on said surface thereof by welding.

2. A method of manufacturing a heat transmitting member, comprising the steps of:

flattening out fiber with metal powder, into a predetermined sheetlike molded article;

placing the molded sheet, which contains said metal powder, on a surface of a body of said member; and heating the member body and the placed molded sheet so as to burn off said fiber and to sinter said metal powder, thereby producing a porous metal material and simultaneously making said porous metal material unitary with said member body on said surface thereof by welding.

3. A method of manufacturing a heat transmitting member, comprising the steps of:

mixing metal powder into a synthetic resin which can form a three-dimensional reticulate structure;

coating a surface of a body of said member with the synthetic resin which contains said metal powder;

blowing said synthetic resin to form said three-dimensional reticulate structure; and heating the member body and the formed three-dimensional reticulate structure so as to burn off said three-dimensional reticulate structure and to sinter said metal powder, thereby producing a porous metal material and simultaneously making said porous metal material unitary with said member body, on said surface thereof, by welding.

4. A method of manufacturing a heat transmitting member as defined in any of claims 1 thru 3, wherein the metal powder is also deposited on said surface of said member body.

5. A method of manufacturing a heat transmitting member as defined in any of claims 1 thru 4, wherein said metal powder is copper oxide powder, or metal powder which contains the copper oxide powder.

6. A method of manufacturing a heat transmitting member as defined in any of claims 1 thru 5, wherein said three-dimensional reticulate structure or said fiber is burnt off in an oxidizing atmosphere, and said metal powder is sintered in a reducing atmosphere.

7. A method of manufacturing a heat transmitting plate, comprising the steps of:

depositing metal powder which is copper oxide powder or which contains the copper oxide powder, onto a surface of a cellular synthetic resin in a vapor phase;

placing the cellular synthetic resin with said metal powder deposited thereon, on a copper plate on which the metal powder being or containing the copper oxide powder is deposited ;

burning off said cellular synthetic resin in an oxidizing atmosphere; and the thereafter sintering said metal powder in a reducing atmosphere.

8. A method of manufacturing a heat transmitting pipe, comprising the steps of:

winding a metal powder-bearing cellular synthetic resin in which metal powder being or containing copper oxide powder has been deposited onto a surface of a cellular synthetic resin in a vapor phase, round a copper pipe in pressed contact therewith, said copper pipe bearing that metal powder being or containing the copper oxide powder which h as been deposited thereonto; and/or shaping the metal powder-bearing cellular synthetic resin into a cylinder, and then inserting the cylindrical cellular synthetic resin into the copper pipe in fit engagement therewith;

subsequently burning off said cellular synthetic resin in an oxidizing atmosphere; and thereafter sintering said metal powder in a reducing atmosphere.

9. A method of manufacturing a heat transmitting member, comprising the steps of:

mixing metal powder into a synthetic resin which can form a three-dimensional reticulate structure;

thereafter pouring the metal powder-containing synthetic resin into a void within a frame in which a plurality of metal pipes are arranged at predetermined intervals;

thereafter blowing the poured synthetic resin so as to fill up said void with the metal powder-containing cellular synthetic resin; and heating said metal pipes and said metal powder-containing cellular synthetic resin so as to burn off said cellular synthetic resin and to sinter said metal powder, thereby producing a porous metal material and simultaneously making said porous metal material unitary with surfaces of said metal pipes by welding.

* * * * *